(12) United States Patent
McCalla

(10) Patent No.: US 7,243,044 B2
(45) Date of Patent: Jul. 10, 2007

(54) METHOD AND SYSTEM FOR ASSESSING ENERGY PERFORMANCE

(75) Inventor: Brian McCalla, Parma, OH (US)

(73) Assignee: Johnson Controls Technology Company, Holland, MI (US)

( * ) Notice: Subject to any disclaimer, the term of this patent is extended or adjusted under 35 U.S.C. 154(b) by 99 days.

(21) Appl. No.: 11/112,646

(22) Filed: Apr. 22, 2005

(65) Prior Publication Data

US 2006/0241905 A1 Oct. 26, 2006

(51) Int. Cl.
*G06F 15/00* (2006.01)
*G06F 11/00* (2006.01)

(52) U.S. Cl. .................................................. 702/182
(58) Field of Classification Search ................. 702/182
See application file for complete search history.

(56) References Cited

U.S. PATENT DOCUMENTS

| | | | | |
|---|---|---|---|---|
| 4,971,136 A | * | 11/1990 | Mathur et al. | 165/240 |
| 5,566,084 A | * | 10/1996 | Cmar | 700/276 |
| 6,349,883 B1 | * | 2/2002 | Simmons et al. | 236/46 R |
| 2003/0028350 A1 | * | 2/2003 | Seem | 702/179 |
| 2006/0155423 A1 | * | 7/2006 | Budike, Jr. | 700/286 |
| 2006/0276938 A1 | * | 12/2006 | Miller | 700/295 |

* cited by examiner

*Primary Examiner*—John Barlow
*Assistant Examiner*—Cindy D. Khuu
(74) *Attorney, Agent, or Firm*—Foley & Lardner LLP

(57) ABSTRACT

A computerized system and method for benchmarking energy performance in a building are provided. The method includes receiving utility use data for the building, receiving weather data for the building, and computing a best thermodynamic break-even temperature for the building based on the utility use data and the weather data.

81 Claims, 7 Drawing Sheets

| Usage | Demand (w/SF) | Consumption (KWH/SF/mo) | Hours |
|---|---|---|---|
| Lighting | 2.0 | | |
| Motors | 1.2 | | |
| Plug Load | 0.7 | | |
| Misc. | 1.1 | | |
| Total | 5.0 | 1.0 | 2,000 |

Figure 10

METHOD AND SYSTEM FOR ASSESSING ENERGY PERFORMANCE

FIELD OF THE INVENTION

The present invention relates to systems and methods for assessing energy performance. More specifically, the present invention relates to energy performance benchmarking for buildings.

BACKGROUND OF THE INVENTION

In the facilities management field, energy performance generally refers to how much energy is being consumed in the operation of a typical building or a specific building. Usually, this does not include special cases where a significant amount of energy is being consumed in the building for energy intensive manufacturing operations, such as an automobile assembly plant or a foundry. Instead, it involves energy as a support operation for use of a facility such as an office building, school system, hospital and the like.

Whenever energy is consumed in a building, there is an interest in determining how that building performs in terms of energy consumption relative to the whole population, or some subset of the population that is similar to that building. The methods that have been used in the past for such comparisons have often been referred to as benchmarking, especially when there is an interest in doing a quick calculation of energy consumption or of providing only a rough feel.

Often, such benchmarking involves calculating the total energy that is consumed in a building or set of buildings, possibly across all energy sources. Thus, it might involve calculating the sum of energy consumed through, for example, electricity, natural gas and fuel oil. Once computed, each of these measures are typically compared to some simple but important metric. For example, metrics that might be used to normalize such benchmark calculations could include the total floor area of the building (e.g., square footage), the number of people in the building, the number of occupants, or in a hospital it might be the number of beds.

Frequently, the way such benchmarking is done is that all the energy consumed in the building is added up, the total energy is converted (if necessary) to common units (e.g., BTUs), and then it is compared to the selected metric (e.g., the floor area or square footage). As one example, the annual energy consumption in a building across all sources may be aggregated and then divided by the square footage of the building to provide a benchmark. In this case, the benchmark many be expressed as the number of BTUs per year per square foot. This type of benchmark is commonly known as an energy use index.

As persons skilled in the art will appreciate, the foregoing methodology for benchmarking the energy use in a building is not without problems. One problem is that electricity is a fuel source that comes into a building at 100% efficiency, whereas natural gas or another fuel is typically not 100% efficient. For this reason, any comparison of energy performance between a building that consumes only electricity versus a building that consumes mostly natural gas and only a small amount of electricity will automatically have some built-in error. This error results from the inefficient nature of natural gas compared to electricity, even though the total energy coming into both buildings may be the same.

In a typical building, where electricity is used for everything (e.g., lighting, heating, cooling, computers, etc.), there will be less energy input to the building than what would be required if fuels were used. For example, if heating and domestic water are accomplished in that same building with natural gas, the energy input into the building will be higher than if electricity were used. Although this may not seem like a big difference, when one considers that the efficiency of such combustion systems is often 80% or less, the differences can be large when accumulated over multiple systems and a sufficiently long period of time.

Oftentimes, what is done to avoid this type of error in the results is that buildings are benchmarked by utility type. Thus, instead of looking at, for example, total BTUs per square foot in terms of aggregate energy use for electricity (after conversion) and natural gas, buildings may be benchmarked in terms of, for example, kilowatt hours per square foot of electrical use separately from BTUs per square foot of natural gas. This results in a more accurate system because it overcomes the disconnect resulting from efficiencies of use inherent in different types of energy use.

This is not to say that a benchmarking methodology that performs separate comparisons based on energy use type is without problems. For example, one problem with such a methodology is that even when two buildings are completely identical (e.g., same construction, same heating and cooling systems, same lighting and loads, etc.), the way in which they consume energy may be completely different due to their geographic locations. For example, identical buildings located in Florida and Alaska would each be expected to use energy in significantly different ways. The reason for this is obvious—it is much harder to cool the building in Florida than in Alaska. Conversely, it is much harder to heat the building in Alaska than in Florida. Of course, there are a wide variety of locations across those descriptions which could result in equally skewed results.

In some benchmarking methodologies, the differences in energy usage resulting from differing geographic locations is essentially ignored. More often, however, what is done to overcome this problem is that buildings are benchmarked across a group of buildings within a particular geographic region that provides a logical basis for comparison. For example, data may be collected and used to compute the total BTUs per square foot or kilowatt hours per square foot across all buildings in Wisconsin. Then, when another building comes along in Green Bay, Wis., it can be compared to the other buildings in Wisconsin with a reasonable level of comfort that they are basically similar.

Although the foregoing is a fairly good system for benchmarking energy use, it also has some problems. One problem is that the reliability or accuracy of one's ability to benchmark (e.g., determine where one particular building stands in terms of energy consumption relative to all other buildings in the region, or to all buildings in the region having a similar construction or use) is dependent upon the population (i.e., the number of buildings for which there is data). Thus, if there is data for only one building and a second building is brought in and compared to the first building, the basis of comparison is relatively poor because it is unknown whether the first building is average. For this reason, it is desirable to have a population that is as large as possible. When the benchmarking methodology is restricted to only certain local climate geographies, the ability to have a large population is limited.

In view of the foregoing, it would be beneficial to provide methods and systems for comparing buildings regardless of their climate, but still obtain accurate results. Moreover, it would be desirable to provide methods and systems that allow accurate benchmarks to be computed regardless of where the buildings are located. It would further be desirable to provide methods and systems that allow the collection of data from buildings all around the world and to compare the performance of any one building to that entire set and be confident in the results. It would further be desirable to provide methods and systems that allow the construction of large databases of benchmarking data from widely geographically dispersed buildings.

SUMMARY OF THE INVENTION

The present invention relates to systems and methods for assessing energy performance. The systems and methods may be used to obtain building performance benchmarks and system performance benchmarks.

According to a first embodiment, a method implemented using a computerized system for benchmarking energy performance in a building includes receiving utility use data for the building, and receiving weather data for the building. The method further comprises computing a best thermodynamic break-even temperature for the building based on the utility use data and the weather data.

According to another embodiment, a computerized system for benchmarking energy performance in a building comprises a central processing unit ("CPU") and a storage device coupled to the CPU. The storage device has information stored therein for configuring the CPU to receive utility use data for the building and receive weather data for the building. The storage device also has information for configuring the CPU to compute a best thermodynamic break-even temperature for the building based on the utility use data and the weather data.

According to another embodiment, a computerized system for benchmarking energy performance in a building comprises means for receiving utility use data for the building and means for receiving weather data for the building. The system further comprises means for computing a best thermodynamic break-even temperature for the building based on the utility use data and the weather data.

These and other benefits and features of embodiments of the invention will be apparent upon consideration of the following detailed description of preferred embodiments thereof, presented in connection with the following drawings in which like reference numerals are used to identify like elements throughout.

BRIEF DESCRIPTION OF THE DRAWINGS

FIG. 10 illustrates an exemplary table that may be used to apportion the benchmarks obtained using the methodology shown in FIG. 2 to different systems in a building.

Figure 1:
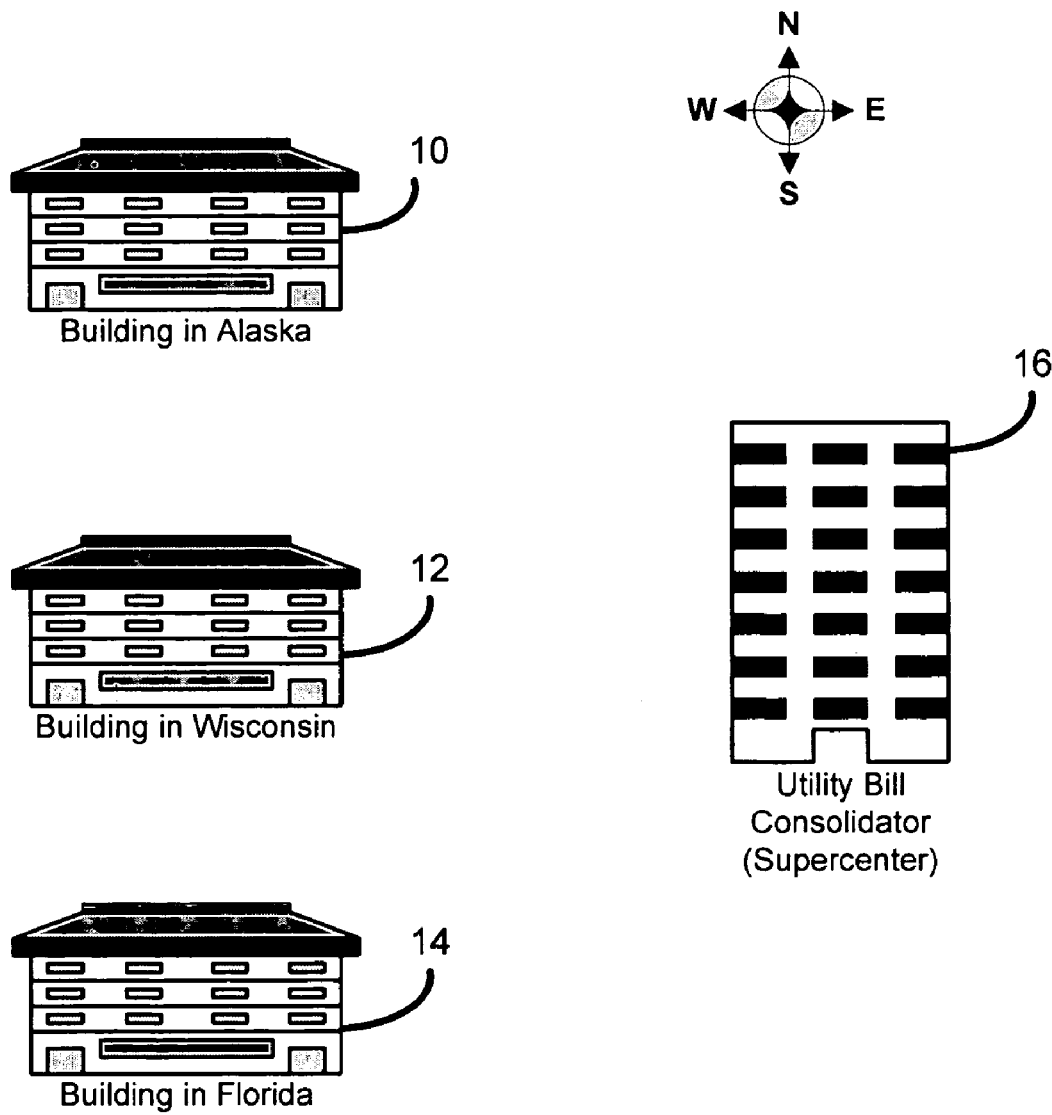
FIG. 1 shows three buildings located in differing climate geographies for which it is desired to benchmark their energy performance.

Before explaining several preferred embodiments of the present invention in detail it is noted that the invention is not limited to the details of construction or the arrangement of components set forth below or illustrated in the drawings. The invention is capable of other embodiments and being practiced or carried out in various ways. It is also noted that the phraseology and terminology employed herein is for purposes of description only and should not be regarded as limiting.

DETAILED DESCRIPTION OF THE PREFERRED EMBODIMENTS

Turning now to the drawings, FIG. 1 shows three buildings 10, 12 and 14 in differing climate geographies for which it is desired to measure their relative energy performance. For example, building 10 may be located in Alaska, building 12 may be located in Wisconsin, and building 14 may be located in Florida. Buildings 10, 12 and 14 may be owned and/or managed by the same entity or different entities.

In many cases, building 14 in Florida will have a different energy provider than building 12 in Wisconsin. In addition, building 14 in Florida may itself have more than one utility provider. For example, building 14 may have an electricity provider that is different from its fuel provider, and both of which are different from its natural gas provider. In an exemplary embodiment, all of the utility service providers send their utility bills directly to a super center 16 that consolidates the bills for its customers (e.g., buildings 10, 12 and 14). Each of the buildings 10, 12 and 14 may have a contractual relationship with super center 16 to consolidate the utility bills, or the relationship may arise from some other source such as super center 16 being the corporate headquarters.

Figure 2:
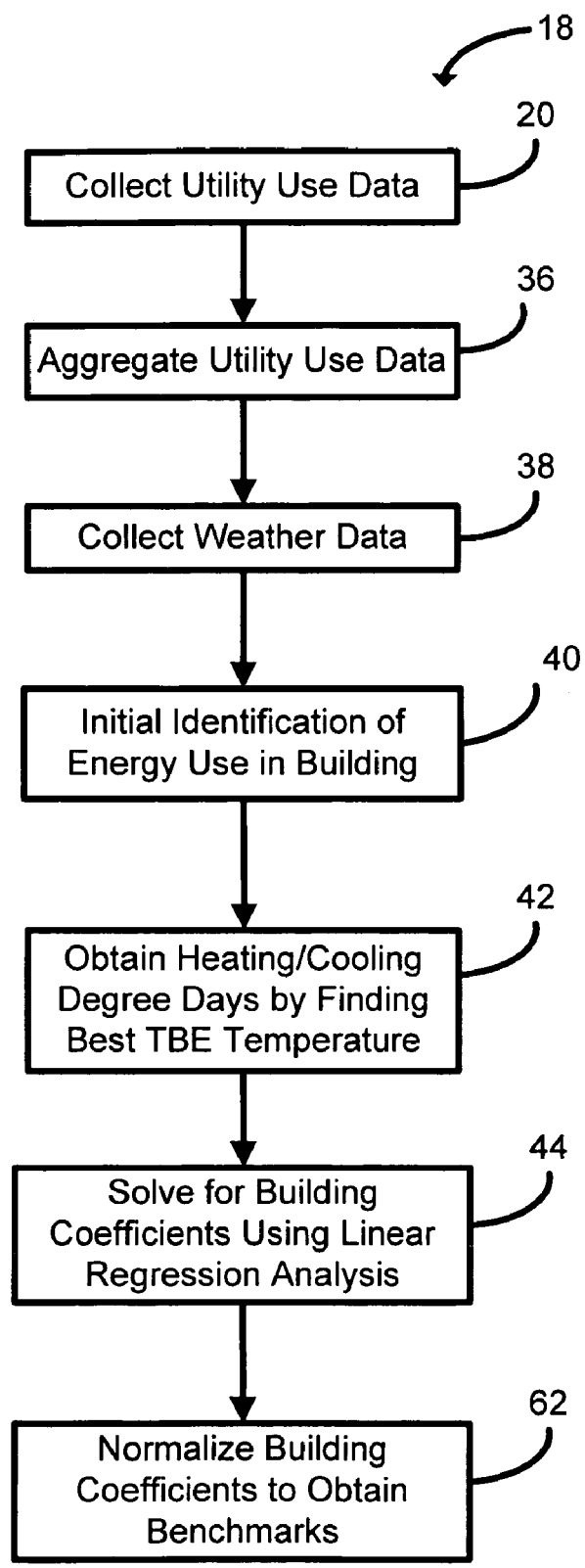
FIG. 2 is a logic flow diagram of a methodology for benchmarking energy performance in accordance with an exemplary embodiment.

FIG. 2 shows a method 18 for benchmarking energy performance in accordance with an exemplary embodiment. Method 18 begins with a step 20 comprising the collection of historical utility use data. For example, step 20 could involve collecting one or two year's worth of utility bills or invoices. This could be done by obtaining stacks of paper invoices from the owners of buildings 10, 12 and 14, from super center 16, or directly from the utility providers. Alternatively, the data could be collected electronically from any of these sources in any combination. As yet another alternative, the utility data could be collected by directly monitoring the energy meters at buildings 10, 12 and 14 in real time or at periodic intervals (e.g., weekly, monthly, semi-annual, etc.).

Figure 3:
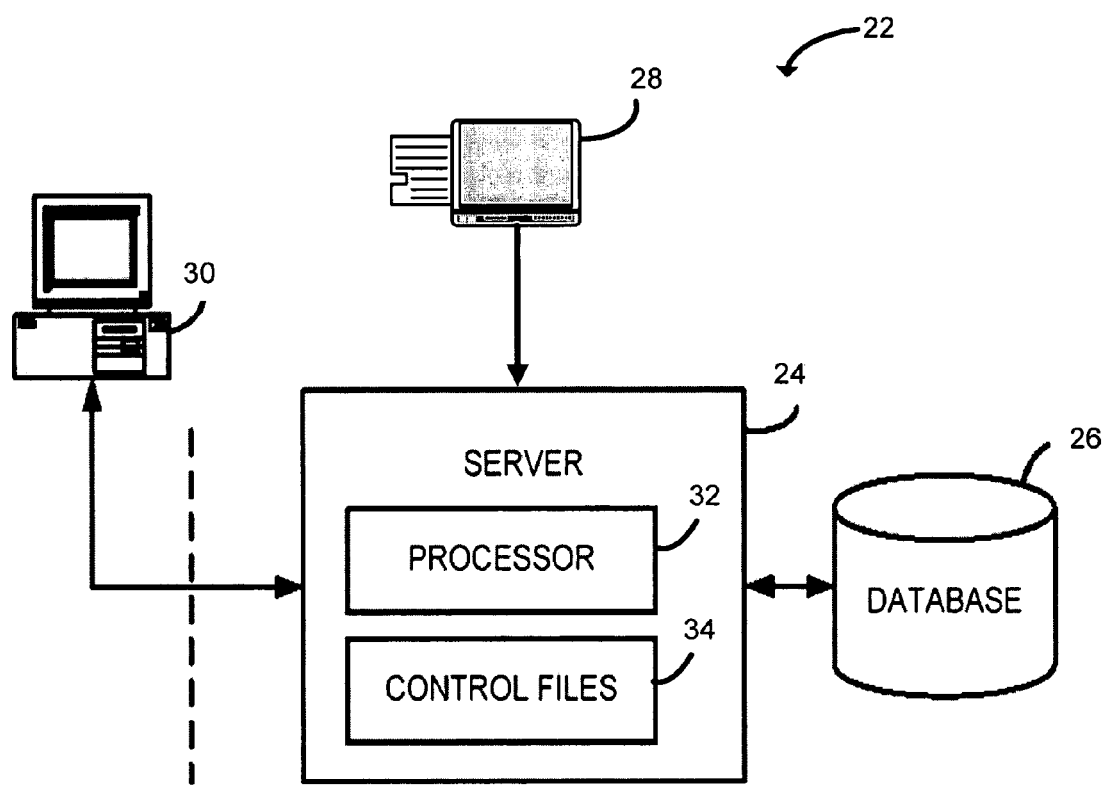
FIG. 3 is a block diagram of a computerized system which may be used to implement the various methods, systems and tools described in connection with the exemplary embodiments.

In an exemplary embodiment, method 18 may be embodied as programmed instructions and data and implemented, for example, on a system 22 such as shown in FIG. 3. System 22 may be located at super center 16, in one of buildings 10, 12 and 14, or at some other location. System 22 includes a server 24 which is communicatively coupled to a database 26, a scanner 28 and a computer 30. Computer 30 may be connected to server 24 by any standard communications means (e.g., LAN, WAN, wireless, intranet, Internet, etc.). In an exemplary embodiment, computer 30 is a remote computer that is connected to server 24 over the Internet using a standard web browser interface via web services (e.g., SOAP). Computer 30 may include a screen display and operator input device (e.g., keyboard) to allow data in system 22 to be manipulated and any output to be viewed, stored, and communicated to other systems. Server 24 may include a processor 32 and control files 34. Processor 34 may be operable to execute control files 34 and access data from database 26.

In an exemplary embodiment, when paper invoices are collected they are scanned using scanner 22 and archived in database 26. The scanning and archiving may include an image of each page of each invoice along with any additional information (e.g., text, numbers, dates, etc.) shown on the invoice in any format that is convenient for data manipulation (e.g., ASCII). When historical utility use data is obtained electronically, the scanning step may be omitted.

In the illustrated embodiment, database 26 contains historical utility use data for buildings 10, 12 and 14 located in Alaska, Wisconsin and Florida, respectively. By way of example, building 14 in Florida may consume electricity and natural gas, while buildings 10 and 12 in Wisconsin and Alaska may consume electricity and fuel oil. In this case, database 26 stores electrical use data for buildings 10, 12 and 14, fuel oil use data for buildings 10 and 12, and natural gas use data for building 14.

Referring again benchmarking method 18 shown in FIG. 2, a step 36 comprises aggregating the historical utility use data for a desired period of time. When buildings are larger than just residential structures (e.g., office buildings, schools, hospitals), it is not uncommon for there to be multiple meters feeding one building for the same energy source. For example, it may be that building 14 in Florida actually has two electrical meters and one natural gas meter. In addition, it may be that building 12 in Wisconsin has only one electrical meter, while building 10 in Alaska may have three electrical meters and two natural gas meters. In such buildings, it is understood that consumption of electricity (or fuel) may not be dictated by just one invoice. Hence, step 36 may involve aggregating the electricity consumed at each building over multiple meters.

In step 36, the aggregation may be performed over any desired time period, such as by calendar month. Since invoices are not always sent by calendar month, however, it may be necessary to prorate (e.g., using linear interpolation) to adjust the utility use data so that the numbers being aggregated provide a good representation of the actual values for the calendar month.

In the illustrated embodiment, step 36 in FIG. 2 could be performed by aggregating electricity separately for each building 10, 12 and 14 in FIG. 1 for each calendar month during which data was collected. This would provide for each building a representation of the total electrical cost during the calendar month, total electrical consumption during the month and, in most cases, total electrical demand (or peak demand) during the month. As persons skilled in the art will understand, electrical consumption represents the amount (or volume) of energy consumed over a given period of time, while peak demand is the highest rate of consumption at any point over the given period. Electrical consumption and demand may be expressed in any convenient units, such as Kilowatt hours ("KWH") for consumption and Kilowatts ("KW") for demand.

In step 36, each of the foregoing values (i.e., electricity cost, consumption and peak demand) may be aggregated separately for each building, but each aggregate value includes the data from all of the electrical meters associated with that building. Thus, electricity is aggregated in step 36 to provide a representation of cost, consumption and demand by month for each building. Step 36 is then repeated in each building for fuels. In an exemplary embodiment, fuels includes any non-electrical energy source. For example, fuels could include natural gas, fuel oil, or a combination of natural gas and fuel oil. Fuels could also include coal, municipal steam, municipal hot water, and the like.

When aggregating fuels in step 36, it may be necessary to convert the energy used into common units. For building 14 in Florida, for example, the amount of natural gas used may be converted into a common unit such as BTUs (or jewels). If building 14 were to also use fuel oil and steam, those values could be converted into BTUs (or jewels) and aggregated with the natural gas to provide a total aggregate fuel use for building 14. This same aggregation step could be done for fuels consumed in building 12 in Wisconsin and building 10 in Alaska.

Thus, the result of step 36 for each facility is a relatively long historical period (e.g., 24-month picture) by sub-period (e.g., month) of the total fuel cost and use expressed in common energy units along with the total electricity use in common units. This data is preferably aligned over the same time periods for all of the buildings and all of the energy sources.

Referring again to method 18 illustrated in FIG. 2, a step 38 comprises collecting weather data. The weather data is preferably collected over the same time period as the utility use data and from the same or substantially the same geographic area or region as the utility use. In an exemplary embodiment, the weather data comprises temperature data, such as the actual daily highs and lows. Alternatively, the weather data could comprise hourly temperature data, or even minute by minute. Regardless whether daily highs and lows are used or hourly data, the objective is to manipulate that data using system 22 to come up with the same output data set (described in detail below).

After the energy (e.g., electrical and fuel) use is aggregated in step 36, system 22 (see FIG. 3) may be used to observe the electrical and fuel use and make an initial determination in a step 40 of how the energy is being used in the building. For example, the electrical use may be seen to rise in the summer but remain relatively constant during the winter. Similarly, the fuel use may be seen to remain relatively constant in the summer and go up in the winter. From these types of observations, an initial decision can be made regarding the likely uses for electricity and fuels during each time period. This initial decision may be made manually by a user of system 22, or it may be an entirely automated decision made by processor 32 executing appropriate control files 34.

In an exemplary embodiment, the process of initially identifying the uses of electricity in step 40 may be simplified by limiting the options as follows: electricity is being used for heating and not for cooling, electricity is being used for cooling and not for heating, electricity is being used for both heating and cooling, and electricity is being used for neither. The same four options may be made to simply the initial identification of fuel uses in the building: fuel is being used for heating and not for cooling, fuel is being used for cooling and not for heating, fuel is being used for both heating and cooling, and fuel is being used for neither.

During step 40, the initial identification for the likely uses of electricity and/or fuel in a building may be based on whether such use appeared to have increased or decreased. Such preliminary identifications can easily be changed for subsequent steps and iterations of method 18 as discussed below. In an exemplary embodiment, the initial identification of energy usage is made by a person in order to simplify the process. Alternatively, the initial identification of energy usage could be made by processor 32 implementing appropriate search algorithms (e.g., empirical methods, expert systems, fuzzy logic, etc.). One advantage of having a person make these determinations, however, is that it allows additional flexibility in which the user can go back and examine the values under a different set of determinations.

The following example helps to illustrate this advantage. In some buildings, electricity is not used for heating at all. Instead, fuels are used for heating. However, people in these buildings will periodically bring space heaters into the buildings and plug them in. In this case, the user may want to perform a "what if" scenario to see how modeling of the energy performance with electric heating versus no electrical heating impacts the model.

It should be emphasized at this point that the initial determination in step 40 of how each energy source is being used (i.e., heating only, cooling only, both heating and cooling, or neither) is merely a first pass. Frequently, the user knows this information anyway because they are familiar with the building or have inspected it.

After the weather data (e.g., temperature) has been collected and the initial determinations of energy use have been made, the utility use and weather data may synthesized in a step 42 to obtain for the building the heating and cooling degree days for each period. As persons skilled in the art will appreciate, the heating and cooling degree days can be computed from the temperature data and another parameter known as the thermodynamic break-even (or basis) temperature. The thermodynamic break-even ("TBE") temperature for a building is the ambient (i.e., outside air) temperature above which that building will begin to accumulate heat and the interior temperature will rise, and below which the building will lose heat (or warmth) and the interior temperature will drop.

As persons skilled in the art will appreciate, the TBE temperature of a building can be can be "discovered" empirically. That is, the TBE temperature can be measured or deduced from empirical data. It can also be theoretically calculated based on, for example, the overall insulation value of the building (e.g., the R value or U value), the non-controlled heat (e.g., body heat, lights which throw off heat, computers which throw off heat) produced in the space, and the interior (or set point) temperature which is the temperature that the interior space most often sits at. The actual details of how such a theoretical TBE temperature calculation is performed are well known to persons skilled in the art and are not repeated here.

As persons skilled in the art will appreciate, the TBE temperature for a building is typically needed to calculate the heating and cooling degree days from historical temperature data. This is because, given any set of temperature data, there is an infinite number of heating and cooling degree days depending on what TBE temperature is selected. Assuming a building consumes energy for heating and cooling, there is a known linear relationship between the energy consumed in the building for the heating and cooling degree days. Hence, if the amount of electricity that a building consumes for cooling were plotted against the number of cooling degree days ("CDD") for that consumption period, the data points would all basically follow a straight line. The same graph would result from plotting the amount of electricity that a building consumes for heating against the number of heating degree days ("HDD"). Hence, heating and cooling degree days are important for accurate benchmarking.

The following example will help make this known linear relationship between energy consumption and heating/cooling degree days more clear. Assuming a building has a TBE temperature of 65° F., if the entire month the ambient temperature outside was 64° F., the building experienced 30 HDD during that month. By contrast, if it was 65° F. for the entire month except for one day, during which it was 35° F., that same building also experienced 30 HDD for that month. In theory, the building would consume the exact same amount of energy for heating over the course of that month in both scenarios.

If the user or search algorithm indicated in this initial pass that the building consumed or used electricity only for cooling (i.e., not for heating), then the electrical consumption (e.g., kilowatt hours) may be plotted against CDD in step 42. By contrast, if the user or search algorithm indicated that fuel is being used only for heating (i.e., not for cooling), then fuel energy units may be plotted against HDD in step 42.

As explained above, when these types of plots are done correctly the result of each plot should be essentially a straight line. In order for this to happen, however, the correct or optimal TBE temperature must be used to plot the data. For example, the plots would be different if a TBE temperature of 60° F. were used instead of 65° F. In one embodiment, therefore, the amount of fuel used for heating/cooling is plotted against the number of heating/cooling degree days for a whole range of reasonable TBE temperatures. The objective of this plotting is to find the "best" fit, i.e., the TBE temperature that plots that data along a straight line with minimal aggregate error. This approach may be referred to as linear best fit or linear regression analysis. The "best" linear regression will typically be achieved at the correct or optimal TBE temperature. For example, if fuel energy consumption is plotted against HDD, and the true TBE temperature for the building is 65° F., then if it is plotted at 66° F. there will typically be more error in that line as compared to when it is plotted at 65° F. The best linear fit may be determined visually by a user or, alternatively, by processor 32 executing control files 34. In the latter case, control files 34 may implement a search algorithm employing statistical analysis, fuzzy logic, or any other known technique for performing the linear regression analysis to find the best TBE temperature.

Figure 4:
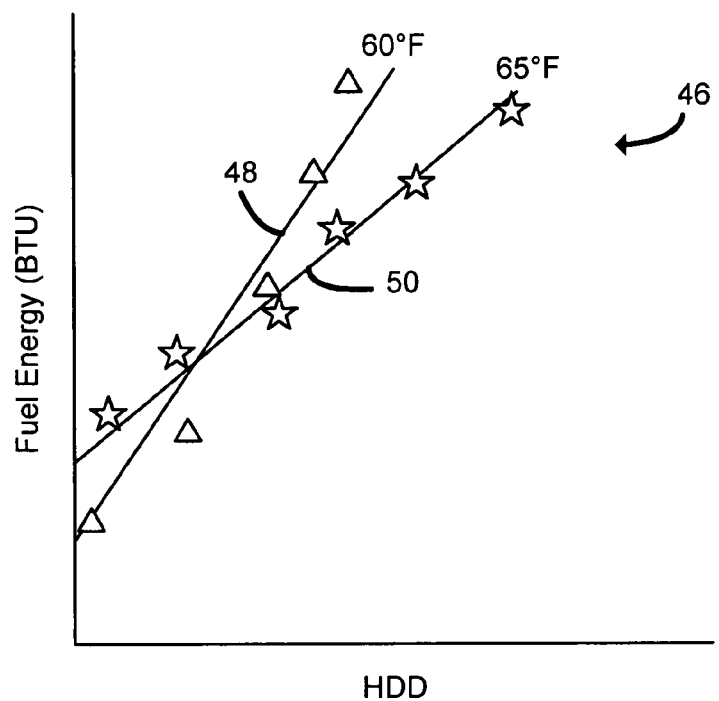
FIGS. 4–6 illustrate exemplary graphs that may be used in connection with the benchmarking methodology shown in FIG. 2.

FIG. 4 shows an exemplary graph 46 that is used to plot fuel energy use versus HDD over a consumption period (e.g., a month) for two different assumed TBE temperatures. In graph 46, the vertical (or rise) axis represents fuel energy in BTUs, and the horizontal (or run) axis represents the number of HDD in degrees Fahrenheit. Graph 46 includes a first plot comprising the "triangle" data points, which assumes a TBE of 60° F. and results in a best fit line 48. In addition, graph 46 includes a second plot comprising the "star" data points, which assumes a TBE of 65° and results in a best fit line 50. The best fit line that provides the lowest magnitude of the error for the two data plots in graph 46 can be determined visually by a user or, alternatively, automatically by processor 32 executing control files 34. Such control files 34 may implement any appropriate logic algorithm (e.g., linear regression analysis) that is known in the art for assessing aggregate error in a data plot.

In graph 46, it can be seen that best fit line 50 is preferable to best fit line 48 because it has a lower cumulative error for the associated data points. Thus, it may be assumed for purposes of implementing exemplary method 18 (see FIG. 2) that the true or optimal TBE temperature for the building is closer to 65° F. than 60° F. Additional iterations can be performed to search for another TBE temperature that provides an even better fit than 65° F.

As persons skilled in the art will appreciate, numerous techniques are known for fitting a straight line to a data plot and for calculating the absolute magnitude of the residuals. One such class of methods makes use of linear regression analysis, such as least-squares regression. Instead of fitting a straight line to the data plot and assessing the magnitude of the residuals, another technique for finding the optimal TBE could be to fit the best line to the data (which may be a curved line), and then select the TBE temperature that results in the line that is most linear as being optimal.

According to an exemplary embodiment, any outliers in the data plots may be removed prior to and/or during the process of determining the best fit. This may be done visually by a user or, alternatively, automatically by processor 32 implementing control files 34. Such control files may implement any suitable outlier detection and removal algorithm. As persons skilled in the art will appreciate, outliers are values that differ significantly from the majority of values in a data set. For example, the number 99 may be considered an outlier in the following data set: {4, 5, 3, 6, 2, 99, 1, 5, 7}. Numerous methods are known to persons skilled in the art for automatically identifying outliers in both single and multiple dimensions, and such methods need not be detailed herein.

In addition to performing step 42 for fuels, it may also be performed for electricity. When performed for electricity, step 42 may involve not only looking at consumption (e.g., KWH) relative to the heating/cooling degree days for the month, but also peak demand relative to the peak temperature difference ("PTD"). The PTD is a parameter that represents, in the case of heating, the difference between the TBE temperature of that facility and the minimum temperature during that month. The PTD parameter in this case may be referred to as the heating temperature difference ("HTD"). For cooling, the PTD parameter is equal to the maximum temperature for that month minus the TBE temperature, and it may be referred to as the cooling temperature difference ("CTD").

Figure 5:
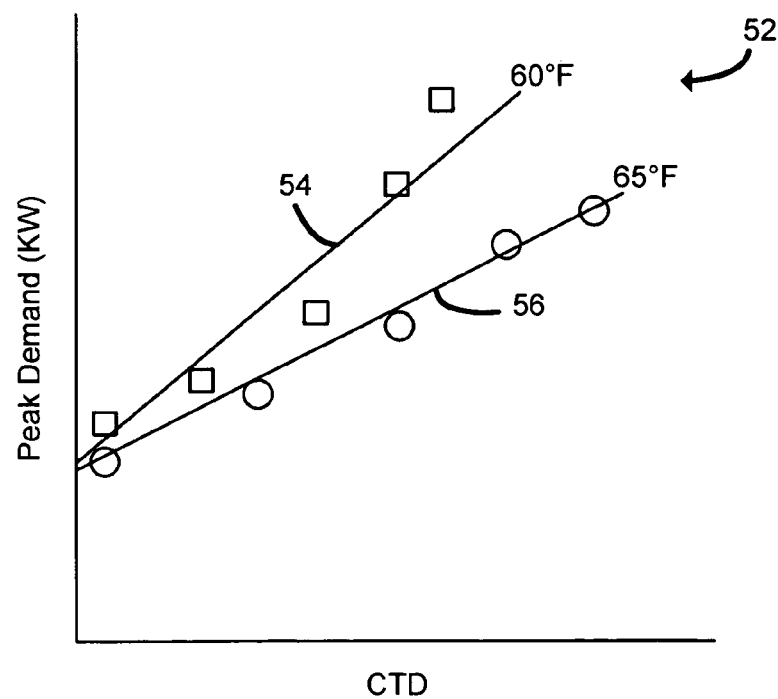

FIG. 5 shows an exemplary graph 50 that is used to plot electrical peak demand (i.e., instantaneous energy use) against CTD. As with graph 46, a positive linear relationship should be evident in graph 52 when the optimal TBE temperature is used for plotting electrical demand against HTD and/or CTD. In graph 52, a first plot comprising the "square" data points assumes a TBE of 60° F. and results in a best fit line 54. In addition, a second plot comprising the "circle" data points assumes a TBE of 65° F. and results in a best fit line 56. In this example, the TBE of 65° F. results in a linear best fit with less residual error than linear best fit associated with the TBE of 60° F. Hence, the results obtained from graph 52 increase the confidence in the results obtained from graph 46.

As persons skilled in the art will appreciate, the simultaneous use of graphs 46 and 52 (i.e., plotting electrical consumption against heating/cooling degree days and plotting electrical demand against heating/cooling PTD) for analyzing electricity usage improves the data model and thus improves the confidence in the TBE temperature that is obtained. If demand is metered for fuel use, and particularly if there is a separate utility charge for such fuel demand, it may be desirable to create a plot similar to graph 52 to further fine tune the TBE temperature.

In a situation where fuels are being used for heating only and electricity is being used for cooling only, the data plots for electricity generated in step 42 would include consumption (in KWH) versus CDDs and peak demand (in KW) versus CTD. The second plot may be thought of as follows: whatever the TBE temperature is, during that time period (e.g., a month), peak demand is plotted against the maximum difference between either the highest or lowest temperature. If it is the lowest temperature, it is the peak HTD. Conversely, if it is the highest temperature, it is the peak CTD.

According to an exemplary embodiment, a single TBE temperature is obtained for all of the graphs plotted in step 42. This may be done by finding the single TBE temperature that minimizes the cumulative (or total) error across the best fits in all of the graphs. This single TBE temperature is selected for further processing in the remaining steps of method 18 as described in further detail below.

In an exemplary embodiment of method 18, the TBE temperature being evaluated in step 42 is input simultaneously into all of the graphs that are available. Accordingly, this method may be used to find the TBE temperature of a building by simultaneously examining up to three different data sets in the exemplary embodiment. For example, the data sets could include: fuel use versus heating degree days or cooling degree days or both; electrical use versus heating degree days or cooling degree days or both; and electrical demand versus heating peak temperature difference or cooling peak temperature difference or both. During the iterations, a user of system 22 or processor 32 executing control files 34 varies the TBE temperature in such a way that all three of these data sets provide the best models. The objective of step 42 in this exemplary embodiment is to find a single TBE temperature that best satisfies all three models. For example, a TBE temperature of 60° F. may be input into all three models and the cumulative aggregate error calculated.

Instead of using all three data models, it may be sufficient or desirable in some circumstances to use only two models in step 42. The two data models could cover different fuel sources (e.g., electrical and fuel), or they could cover the same fuel source (e.g., electrical) but one model could be based on one parameter (e.g., electrical consumption) and the other on its first time derivative (e.g., peak electrical demand). Other variations are possible.

As persons skilled in the art will appreciate, a benchmarking methodology that searches for the TBE temperature based on the use of two models simultaneously, or three models simultaneously, should result in a more accurate representation of the true TBE temperature than finding the TBE using each model separately and then averaging the results.

Figure 6:
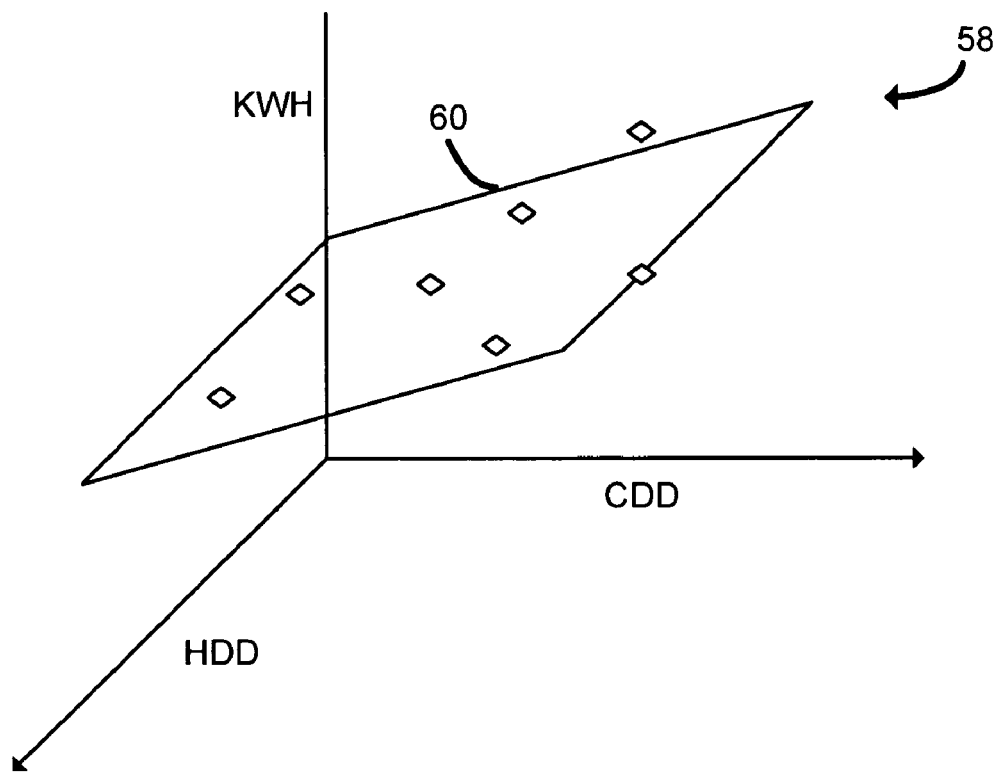

FIG. 6 shows an exemplary graph 58 for a building in which electricity is used for both heating and cooling and the building is all electric (i.e., no fuel at all). Graph 58 is illustrated as a three-axis graph in which electrical consumption (e.g., KWH) is plotted on the vertical (X) axis, CDD is plotted on the horizontal (Y) axis, and HDD is plotted on the projecting (Z) axis. In graph 58, the data plots are indicated by the "diamonds" and collectively may be best fit onto a geometric inclined plane 60 (rather than an inclined line as shown in graphs 46 and 52). A similar graph may be used for a building in which fuel is used for both heating and cooling and the building is all fuel (i.e., no electricity at all).

To summarize step 42, when fuel or electricity is being used for heating only or cooling only, the data plots should fall generally on an inclined line in a two-dimensional space. By contrast, when electricity or fuel is being used for both heating and cooling, the data plots in step 42 should fall generally on an inclined plane in a three-dimensional space.

At this point, it should be understood that step 42 does not require that the data plots discussed above be actually graphed and displayed to a person. For example, where processor 32 is executing control files 34 to find the best fit using a fully or partially automated approach for identifying the best TBE temperature, such graphs are not needed or required. Even with a fully automated approach, however, graphs such as illustrated in FIGS. 4–6 may be produced so that trained personnel can monitor the analysis and, if appropriate, intervene to refine and/or correct the process or results.

Returning again in method 18 in FIG. 2, a step 44 may be used to identify certain energy use parameters regarding the building (i.e., building benchmarks). In an exemplary embodiment, step 44 may be performed using simple expressions such as the following:

$$KWH = B_E + C_{CE}*CDD_{BET} + C_{HE}*HDD_{BET} \qquad \text{EQ. 1}$$

$$BTU = B_F + C_{CF}*CDD_{BET} + C_{HF}*HDD_{BET} \qquad \text{EQ. 2}$$

$$KW = B_{Ed} + C_{CEd}*CTD_{BET} + C_{HEd}*HTD_{BET} \qquad \text{EQ. 3}$$

As discussed in detail below, one, two or all three of these equations may be solved simultaneously to empirically derive certain coefficients which, in turn, may be used to obtain important benchmarks regarding not only energy performance of the building but also of various systems within the building.

When electricity is used for both heating and cooling, EQ. 1 provides a first general form equation that may be used to find the TBE temperature and the other unknown coefficients. In this equation, $B_E$ is the base consumption of electricity, $C_{CE}$ is the cooling coefficient for electricity, $CDD_{BET}$ is the cooling degree days at the specific TBE temperature, $C_{HE}$ is the coefficient of heating for electricity, and $HDD_{BET}$ is the heating degree days at that same TBE temperature. If no cooling is taking place in the building, or if electricity is not being used for cooling, the $CDD_{BET}$ coefficient is zeroed out and the equation may be simplified. The same applies to heating for the $HDD_{BET}$ coefficient.

When fuel is used for both heating and cooling, EQ. 2 provides a second general form equation that may be used to find the TBE temperature and the other unknown coefficients. In this equation, $B_F$ is the base consumption of fuel, $C_{CF}$ is the cooling coefficient for fuel, and $C_{HF}$ is the coefficient of heating for fuel. The base consumption for fuels ($B_F$) is the amount of fuel consumed for other than heating and cooling. For example, fuel used for domestic hot water production would be included in $B_F$. As with the general equation for electricity provided above, the heating and/or cooling multiplication terms in EQ. 2 may drop out if fuel is used for heating only, cooling only or neither.

When electricity is used for both heating and cooling, EQ. 3 provides a third general form equation that may be used to find the TBE temperature and the other unknown coefficients. In this equation, $B_{Ed}$ is the base demand for electricity, $C_{CED}$ is the coefficient of cooling for electrical demand, $CTD_{BET}$ is the cooling temperature difference at the TBE temperature, $C_{HEd}$ is the heating coefficient for electrical demand, and $HTD_{BET}$ is the heating temperature difference at the BET temperature.

For purposes of explanation, it should be understood that the TBE temperature and each of the other coefficients in EQS. 1–3 corresponds to a specific physical parameter in the building being analyzed. For example, the base consumption for electricity ($B_E$) in EQ. 1 represents the amount of electricity that is used in the building for the given time period (e.g., a month) that is not related to controlling the heating/cooling. This amount typically does not vary from month to month. It results from the use of electrically powered devices such as computers, lights, copiers, fans, and other devices that are not part of the heating/cooling system. The cooling coefficient for electricity ($C_{CE}$) is the number of KWHs that a building consumes in a day for every degree that the outside air temperature is above the TBE temperature for the month. Thus, the number of KWHs of electricity consumed for cooling during the month can be determined by multiplying the number of cooling degrees days above TBE temperature ($CDD_{BET}$) times the cooling coefficient for electricity ($C_{CE}$). The heating coefficient for electricity ($C_{HE}$) is the number of KWHs that a building consumes in a day for every degree that the outside air temperature is below the TBE temperature for the month.

In EQ. 1, the following coefficients are known for any given iteration: the total electrical energy consumed (KWH), the number of cooling degree days ($CDD_{BET}$), and the number of heating degree days ($HDD_{BET}$). Thus, the objective of the iterative linear regression analysis in step 44 is to solve EQ. 1 simultaneous to one or both of EQS. 2 and 3 to find the following coefficients: the base consumption for electricity ($B_E$), the cooling coefficient for electricity ($C_{CE}$), and the heating coefficient for electricity ($C_{HE}$). Once these coefficients are discovered, they will apply for any time period of interest. For example, once the heating coefficient for electricity ($C_{HE}$) is known, the amount of fuel consumed in the building over the last hour for heating can be calculated simply by monitoring the outside air temperature for the last hour.

In EQ. 2, the following coefficients are known for any given iteration: the total fuel energy consumed (BTU), the number of cooling degree days ($CDD_{BET}$), and the number of heating degree days ($HDD_{BET}$). Thus, the objective of the iterative linear regression analysis is to solve EQ. 2 simultaneous to one or both of EQS. 1 and 3 to find the following coefficients: the base consumption for fuel ($B_F$), the cooling coefficient for fuel ($C_{CF}$), and the heating coefficient for fuel ($C_{HF}$).

In EQ. 3, the following coefficients are known for any given iteration: the total peak electrical demand for the period (KW), the cooling temperature difference ($CTD_{BET}$), and the heating temperature difference ($HTD_{BET}$). Thus, the objective of the iterative linear regression analysis is to solve EQ. 3 simultaneous to one or both of EQS. 1 and 2 to find the following coefficients: the base peak demand ($B_{Ed}$), the coefficient of cooling for electrical demand ($C_{CED}$), and the heating coefficient for electrical demand ($C_{HEd}$).

As explained above, all three equations EQS. 1–3 are preferably solved simultaneously because this provides the most confidence in the results. The first set of parameters in the three equations (i.e., $B_E$, $B_F$, $B_{Ed}$) describe energy or power that is used in the building for other than controlling heating/cooling. In theory, this should not change much over each month. The second set of parameters (i.e., $C_{CE} \times CDD_{BET}$, $C_{CF} \times CDD_{BET}$, $C_{CEd} \times CTD_{BET}$) describe the performance of the building in terms of cooling. The third set of parameters (i.e., $C_{HE} \times HDD_{BET}$, $C_{HF} \times HDD_{BET}$, $C_{HEd} \times HTD_{BET}$) represent the heating characteristics of the building.

In the case where the only energy source into a building is electricity which is used only for cooling, then EQS. 1 and 3 would not be needed and EQ. 2 could be simplified by zeroing out the $HDD_{BET}$ coefficient. In this case, it is theoretically possible to solve EQ. 2 with just two months worth of utility and weather data because a straight line can (at least in theory) be defined by two points. However, there would not be much confidence in the results obtained using only two points unless both points are known to be typical of the building. In the case where electricity is used for both heating and cooling, at a minimum three months of data are needed to define a plane. However, again there would not be much confidence in the results obtained using such a minimal set of data.

Thus, the overall objective of step 44 is to take all of the data (e.g., utility usage and weather data) and attempt to find the at most ten numbers (i.e., the nine coefficients specified above and the TBE temperature) that results in the best fit for one, two or all three of equations EQS. 1–3. In most cases, however, less than ten numbers will need to be found. One reason for this is, depending on how electricity and fuel are used in the building, one or two equations may drop out entirely. For example, for a building that is all electric, EQ. 2 drops out completely. As another example, for a building that is all fuel, both EQS. 1 and 3 drop out completely. Even in a building that uses both fuel and electricity (which is the most complicated case and could make use of all three equations), one or more of the heating and/or cooling coefficients might drop out depending on how electricity and fuel are used in the building. For example, if fuel is used in the building for heating only (e.g., a natural gas fired furnace) and electricity is used for cooling only (e.g., air conditioning), the cooling components would drop out of EQ. 2 and the heating components would drop out of EQS. 1 and 3.

According to an exemplary embodiment, the utility use and weather data is collected over an historical time period and used for the analysis. Alternatively, the data could be collected substantially in real time and used to detect problems as well as diagnose any problems that are detected. For example, if the data is collected and analyzed substantially in real time, it is expected that the foregoing coefficients obtained by solving EQS. 1–3 will all be changing slightly over time but remain within a certain band If there is a sudden, radical change in one or more of the coefficients outside of this band, this may be indicative of a problem in the building. Thus, method 18 may be conducted on practically any desirable time period basis such as monthly, hourly, or even minute-by-minute.

As described in further detail below, the results of benchmarking method 18 can be used in a subsequent process to determine not only what is occurring in terms of the entire building, but also in terms of specific systems in the building. For example, the results of method 18 may be used to determine the total electrical consumption during the summer months for everything other than air conditioning. Once obtained, this information can then be combined with other knowledge about other systems in the building (e.g., knowledge that the primary non-cooling uses for electricity during the summer months are for lighting and computers) to identify the amount of electrical consumption for those systems.

Returning again to method 18 shown in FIG. 2, a step 62 comprises normalizing the results obtained from the linear regression analysis in step 44. For example, the base amount of electrical consumption ($B_E$) obtained using EQ. 1 above can be normalized by dividing it by the square footage of the building. This provides a base value of electrical consumption expressed in kilowatt hours per month per square foot that can be used as a basis for comparisons against other buildings anywhere in the world regardless of climate. Similarly, the coefficient of cooling for electricity ($C_{CE}$) can be divided by the square footage of the building to create a benchmark that may be used to compare the cooling efficiency or performance of the building to other buildings in the database regardless of whether the building is located in Florida, Wisconsin or Alaska. The foregoing comparisons are possible because the benchmarks have been normalized not only by square footage but also by the heating/cooling degree days. Thus, even though Florida may have 5 times as many cooling degree days as Wisconsin, the benchmark has been normalized for that discrepancy. Hence, identical buildings located in markedly different geographic climates (e.g., Florida, Wisconsin and Alaska) would be expected to have substantially the same performance numbers.

As explained above, method 18 in FIG. 2 can be used to discover coefficients that are normalized for weather conditions and optionally another metric (e.g., square footage) to define benchmarks for buildings. The benchmarks can be archived in database 26 (see FIG. 3) and used as a basis for comparison against buildings across any climate. Hence, if a building in Florida has a higher cooling coefficient than one in Alaska, a conclusion may be drawn that, for example, the building in Florida is less well insulated (e.g., it lets in more sunlight which heats up the building), that there are more people (which are creating heat) in the building in Florida, or the like. There is no need to draw conclusions regarding the climate differences because any discrepancy from the differences in heating/cooling degree days has been removed.

In an exemplary embodiment, a further normalization may be made in step 62 to account for any differences in the efficiencies of the heating/cooling systems in the buildings. For example, two buildings of identical construction could have two different fuel heating coefficients simply because the fuel combustion heating system of one building may be more efficient than the other. Thus, when the coefficients are obtained they may be interpreted to determine how much heating or cooling is actually going into the space.

Figure 7:
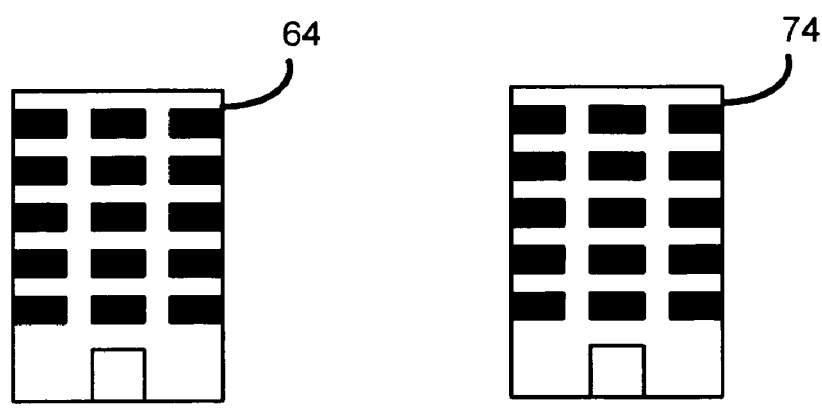
FIG. 7 illustrates two buildings having similar constructions but different internal systems and fuel sources.

Turning now to FIG. 7, a building 64 is shown that includes a heating system but not a cooling system. The heating system in building 64 is a furnace, which uses a fuel source such as fuel oil. In EQ. 2 above, the coefficient of heating for fuel ($C_{HF}$) can be expressed in terms of its dimensions as follows:

$$C_{HF}=(E/HDD)=(E/(T*t)) \qquad \text{EQ. 4}$$

In EQ. 4, E is energy, HDD is one heating degree day, T is temperature, and t is the time period. As is well known, dimensions are the generic form of units. Thus, $C_{HF}$ can be expressed in terms of units as follows:

$$\begin{aligned}C_{HF} &= (BTU/HDD)=(BTU/HDD)*(1\text{ day})/(24\text{ hours})\\ &= BTU(24)*(HD*hr)=(1/24)*(BTU/hr)/HD \qquad \text{EQ. 5}\end{aligned}$$

The coefficient of cooling for fuel ($C_{CF}$) can be expressed in the same dimensions and units as described above in EQS. 4 and 5 except that HDD is replaced by CDD. The coefficient of cooling for electrical demand ($C_{CED}$) can be expressed in units as KWs per cooling degrees Fahrenheit. The coefficient of heating for electrical demand ($C_{HED}$) can be expressed as KWs per heating degrees Fahrenheit. In general, therefore, the units of each coefficient are energy per month divided by degree days.

Returning again to EQ. 5, the coefficient of heating for fuels ($C_{HF}$) is expressed in terms of BTUs per heating degree day (BTU/HDD). If this ratio is multiplied by the equality of 1 day per 24 hours, the days cancel and the result is BTUs per 24 times heating degree hours. This can be rewritten as 1/24 (i.e., the conversion factor) times BTUs per hour per heating degree. As persons skilled in the art will recognize, this value represents the BTUs per hour that are required to heat a building for every degree below break even temperature. This value is often referred to as the heating load.

The following example will help illustrate why knowledge of the heating load can be important. In this example, assume that $C_{HF}$ has been found to be 240 BTUs per heating degree day using a suitable method such as the linear regression approach described above. Also assume for this example that the TBE temperature of the building is 65° F., and that the temperature outside the building is 60° F. Once these values are known, the number of BTUs per hour needed to heat the building is easily determined to be 50. This value of 50 is calculated as 10 times 5 because the difference between the TBE temperature (65° F.) and the actual temperature (60° F.) is 5° F., which is multiplied by 10 BTUs per hour per degree Fahrenheit. The value of 10 BTUs per hour per degree is calculated by multiplying 240 (i.e., the value of $C_{HF}$ in this example) by 1/24 (i.e., the conversion factor). Thus, the building in this example needs about 50 BTUs per hour.

In an exemplary embodiment, the building load calculated in the immediately preceding example can be further refined to account for the efficiency of the heating system. This can be done, for example, by dividing the number of BTUs per hour needed by the efficiency of the heating system. For example, if the efficiency of the heating system in the preceding example is 80%, a more accurate determination of the number of BTUs needed per hour (i.e., the refined load) is 62.5 (=50/0.80). Thus, in this example 12.5 BTUs (=62.5−50) per hour are lost simply due to inefficiencies in the heating system.

As persons skilled in the art will appreciate, knowledge about the building load can be important for certain purposes. For example, this information can be particularly useful when upgrading or replacing a heating/cooling system in a building. This is because building heating/cooling systems are typically designed (i.e., sized) to handle the expected local climate in which the building is situated. For example, building heating systems are often sized to handle 99.5% of the hours of the year based on historical temperatures. That is, the heating system is expected to be able to maintain the desired interior temperature in all but 0.5% of the hours of the year. If the heating system is designed to handle temperatures colder than the 99.5% hours level, the system will be larger than necessary. As persons skilled in the art will appreciate, oversized systems tend to operate less efficiently because they are more likely to cycle on/off too frequently and/or overshoot. In addition, a larger heating system is likely to require a higher initial investment as well as cost more to operate and maintain. On the other hand, if the heating system is designed too small to handle the expected load, the odds are increased that it will not keep up when the temperature drops.

Using the results from method 18 (see FIG. 2), since the TBE temperature is known, along with the design temperature (e.g., 99.5% of the historical temperatures), the difference between TBE temperature and design temperature can be calculated and multiplied by the coefficient of heating, and then divided by the efficiency, to obtain the design load. A similar calculation can be made to calculate the cooling load for the building.

Another advantage of calculating heating/cooling load in this way is that it is based on real or actual performance of the building. Hence, the safety factor that is typically built into heating systems can be smaller than where the heating/cooling load is a purely theoretical value. For example, it is not uncommon to find that 80% or more of the heating systems in existing buildings are oversized in the range of 20–30%. Using a method such as described above, the heating/cooling system can be downsize. This requires a smaller capital investment, which can result in bids for replacing or upgrading a system being more competitive.

In an exemplary embodiment, the heating load can be calculated using the following general expression:

$$L_H = (C_{HF}/(24*E_{FH}))*(BET-T_{DH})+(C_{HE}/(24*E_{EH}))* (BET-T_{DH}) \qquad \text{EQ. 6}$$

In this expression, $L_H$ is the heating load, $E_{FH}$ is the efficiency of the fuel heating system, $E_{EH}$ is the efficiency of the electrical heating system, and $T_{DH}$ is the design temperature for heating. This expression can be simplified as follows:

$$L_H = ((BET-T_{DH})/24)*((C_{HF}/E_{FH})+(C_{HE}/E_{EH})) \qquad \text{EQ. 7}$$

In EQS. 6 and 7, the coefficient of heating for electricity may be expressed in KWHs per cooling degree day. In this case, a conversion factor can be used to convert the KWHs to BTUs so that the equation can be solved.

After the heating/cooling coefficients have been obtained (e.g., using a statistical method such as the foregoing multivariate linear regression analysis described in step 44), further information can be derived regarding actual physical parameters in the building (e.g., building insulation, ventilation, flow rates, power use density, etc.). This can best be illustrated with reference to building 64 (see FIG. 7) in which fuels are only for heating. In building 64, two of the coefficient values that may be derived using a statistical method such as described above are of particular importance. These two values include the base load for fuels ($B_F$) and the coefficient of consumption for heating for fuels ($C_{HF}$), both expressed in BTUs per month.

In most buildings, there are only a limited number of systems that use fuels apart from heating/cooling systems. Perhaps the most common one is domestic hot water. Although other non-heating/non-cooling systems may use fuel, such as kitchen appliances or science lab equipment, the amount of fuel consumed in such systems is typically very small compared to domestic hot water. With the foregoing in mind, it make sense to define two categories for classifying the systems that contribute to the base load for fuel in building 64: one for domestic hot water, and another for everything else.

For purposes of explanation, it may be assumed that the coefficient of base load for fuels ($B_F$) in building 64 has been determined (e.g., using multivariate linear regression analysis) to be 1 million BTUs per month. In addition, it is assumed for this example that building 64 is a relatively small building, such as 1,000 square feet. In this example, the fuel base load benchmark would be obtained by dividing 1 million BTUs per month by 1,000 square feet, which is 1,000 BTUs per square foot per month. This number represents the aggregate base load fuel use, which is also referred to as the base load fuel use density. In either case, it represents a benchmark (expressed in BTUs per square foot per month) for the amount of fuel consumed for non-heating purposes in building 64.

A primary objective of this process is to determine how much of the benchmark for non-heating use of fuel is attributable to domestic hot water as opposed to everything else. These two portions should aggregate to 1,000 BTUs per square foot per month in the example provided above. As explained below, the user need not make an accurate initial determination of this split. Instead, all that the user need do is to make an initial approximation that can be subsequently refined through additional iterations until sufficient confidence is obtained in the result.

A number of techniques may be used to obtain the initial approximation of the distribution of non-heating fuel consumption between domestic hot water and other uses. As will become clear below, one or more of these (or other) techniques may be used in various combinations to obtain the initial approximation as well as to refine the split during subsequent iterations.

Taking domestic hot water first, this number is somewhat known in many circumstances. For example, the average number of gallons of hot water needed per student in a typical elementary school is a known value or could easily be obtained. This number is also known or could easily be obtained for an average hospital based on the number of occupied beds. Hence, in many instances the user will already have a rough feel for where this number should be.

In addition, in many cases the number for domestic hot water usage is constrained. For example, the user analyzing fuel consumption for domestic hot water production in building 64 knows that it cannot be over 1,000 BTUs in the foregoing example. In addition, if the user knows there are uses of fuel other than for heating or domestic hot water, then the user also knows that the number must be less than 1,000 BTUs in this example.

Another technique that may be used is to directly calculate the amount of hot water consumption. Persons skilled in the art are well versed in methods for performing such calculations and hence they are not repeated here.

Figure 8:
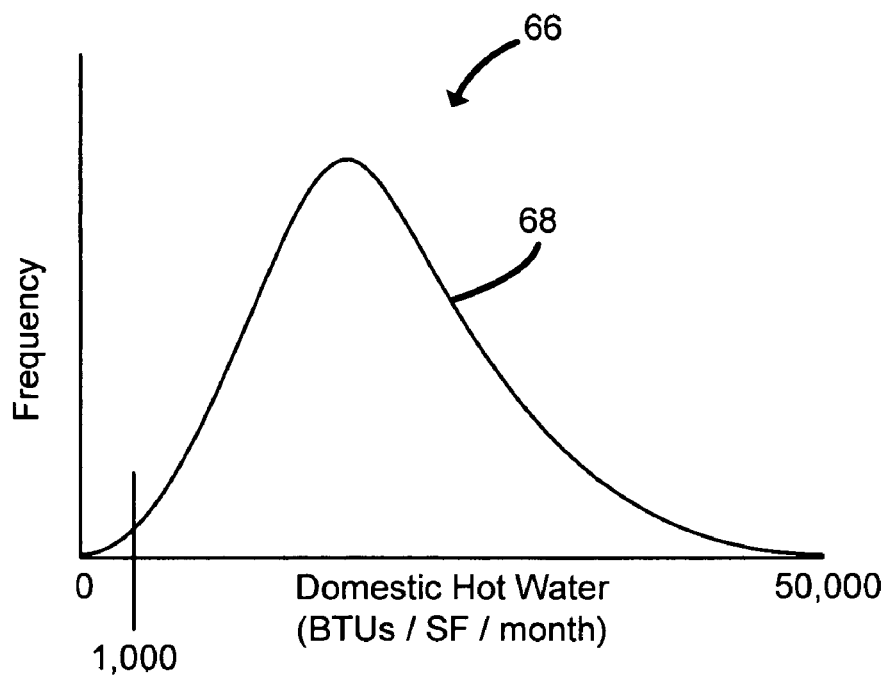
FIGS. 8–9 illustrate exemplary graphs that may be used to apportion the benchmarks obtained using the methodology shown in FIG. 2 to different systems in a building.

Moreover, it may be known from a large database of similar buildings that have already been benchmarked, how much domestic hot water is used in terms of BTUs per square foot. Thus, the user could go into this database and find out the BTUs per square foot of domestic water use for buildings of the same type as building 64. When this is done, what is typically found is a probability distribution of BTUs per square foot per month of domestic hot water use for buildings. For example, FIG. 8 shows a graph 66 having an exemplary probability distribution 68 for domestic hot water ("DHW") usage in terms of BTUs per square foot per month for all types of buildings in the database. In graph 66, the amount of BTUs per square foot per month is plotted on the horizontal axis, and the frequency (i.e., number of occurrences) of each usage is plotted on the vertical axis. Using graph 66, a user may be able to empirically determine an initial estimate for DHW usage in terms of BTUs per square foot per month.

Figure 9:
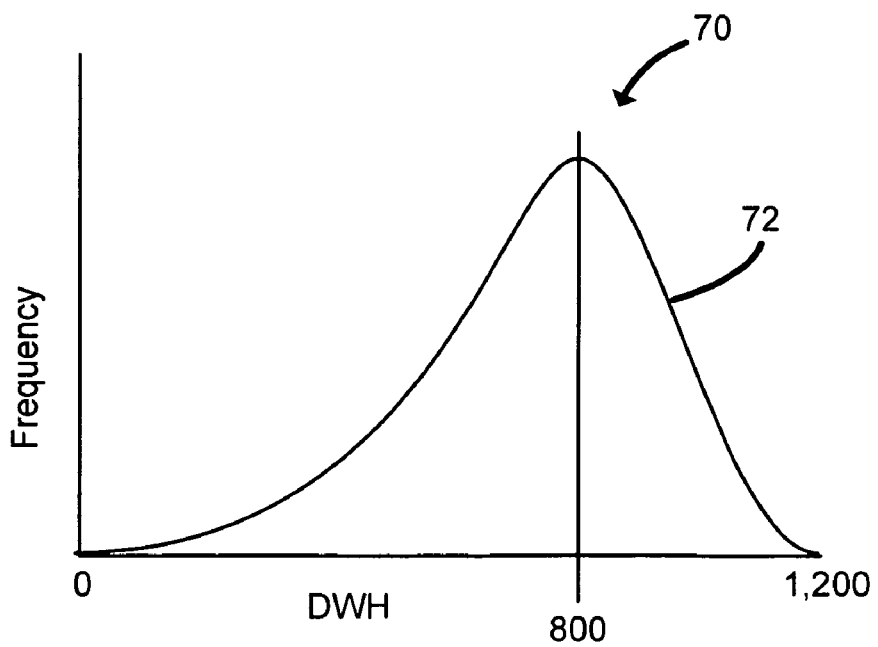

If the database is sufficiently large, this same technique may be used with better results by plotting the domestic hot water usage only for buildings of the same type as building 64. When this is done, a resulting graph 70 may have a probability distribution such as shown in FIG. 9. Using this distribution, a reasonable estimate for the amount of hot water usage in building 64 would be about 800 BTUs per square foot per month. This is consistent with the 1,000 BTU limit that is already known from the constraints discussed above.

Using approaches such as discussed above, an initial estimate for domestic hot water usage can be obtained and improved over successive iterations as discussed below. It should be emphasized that the initial estimate need not be an exact value, but instead merely a representative value that is accurate enough for successive iterations. As explained above, this representative value can be obtained by many techniques such as looking at statistical data in the database, knowing how the number is constrained in terms of the total value and in terms of other known uses and possible outlets, and perhaps manual calculation. These and other techniques can be performed individually as well as in various combinations to obtain the initial estimate and make successive refinements.

For electricity, the initial estimate may be somewhat more complicated to obtain but it follows the same basic approach. Electricity may be more complicated because it typically has more types of usage than fuel. For example, typical non-heating/non-cooling uses of electricity in a building might include lighting, motors (e.g., building infrastructure motors such as fans, pumps, etc.), plug load (e.g., computers, fax machines, copiers, etc.), and the like.

Referring again to FIG. 7, it is assumed that a building 74 is an all electric building having 1,000 square feet of floor space. It is also assumed for this example that multivariate linear regression analysis has been performed to determine that $B_E$ for building 74 is 1,000 KWHs per square foot per month and that $B_{Ed}$ is 5 KWs (i.e., 5,000 watts). The 5,000 watts may be divided by the square footage of the building (1,000 square feet) to come up with a benchmark value of 5 watts per square foot base load demand for building 74. Similarly, the 1,000 KWHs per square foot per month may be divided by the square footage of the building to come up with a benchmark of 1 KWHs per square foot per month base load consumption for building 74.

When dealing with electricity, it may be helpful to create a table 76 such as shown in FIG. 10. As explained above, the total electrical demand for all base-load uses in building 74 aggregates to 5 watts per square foot per month. As such, this number may be placed in a cell 78 of table 76 at the intersection of the Demand column and the Total row. Accordingly, the demand load for lighting, motors, plug load, and miscellaneous in the Demand column must aggregate to 5 watts per square foot.

Continuing with this example, the total electrical consumption for all base-load uses in building 74 aggregates to 1 KWHs per square foot per month. As such, this number can be placed in a cell 80 of table 76 at the intersection of the Consumption column and the Total row. Accordingly, the consumption in building 74 for the four classifications of non-heating usage must aggregate to 10 KWHs per square foot per month.

Table 76 also includes an Hours column, which indicates the run-time hours for each system in building 74 that contributes to the base electrical load. The aggregate run-time hours for base electrical load in building 74 can be readily calculated using a wide variety of techniques. For example, the average run-time hours for all base electrical loads can be calculated from the total consumption in cell 80 (i.e., 1 kilowatt hours per square foot per month) and demand in cell 78 (i.e., 5 wafts per square foot per month). The 1 KWH per square foot per month can be multiplied by 1,000 to convert it to waft hours per square foot per month, which results in 1,000 waft hours per square foot per month. If this number is divided by 5 watts per square foot, the result is 200 hours per month because the wafts cancel and the square feet cancel. This means that, on average, the base load electrical systems in building 74 operate at 200 hours per month across all time periods.

Using table 76 or a similar tool, the demand and run-time hours for the each of the systems that contribute to the base electrical load can be readily determined. Based on the knowledge that the total consumption is about 1 kilowatt hours per square foot per month in building 74, and that the total power density is 5 watts per square foot, it is possible for persons skilled in the art to physically inspect the building and quickly obtain a good rough feel for each of these systems. Additional confidence can be obtained by looking at the base load distribution for other buildings of the same type that have already been benchmarked and then taking the average.

For example, an initial estimate of 2.0 may be provided in the Demand column for the lighting load in building 74. This initial value may be obtained using various techniques described above such as physically inspecting building 74, knowledge of previously benchmarked buildings, and knowledge about where building 74 is in terms of real statistical data (e.g., aggregate base load demand).

There are also good guidelines for estimating the initial value for motor load in building 74 based on the system type. For example, if building 74 has a forced air system for heating, it may be expected to have a relatively high motor load such as 1.2 due to the fans. By contrast, if building 74 has a piped hot water heating system, it is more likely to have a lower motor load such as around 0.7. Persons skilled in the art will tend to know this type of information for many base load systems in common use today.

Similarly, the initial value for plug load in building 74 may depend on whether there are many computers in the building or few, and this will range anywhere from 0 to perhaps around 0.8. Additional confidence in the estimate can be obtained by looking at probability distributions for similar systems in buildings that have been previously benchmarked. Based on these and other techniques, it may be determined that a good initial estimate of the average plug load in building 74 is 0.7 in this example.

A similar process can be used to obtain initial estimates for the Hours column using techniques that are akin to those described above. For example, if it is known that building 74 is open from 7:00 am until 7:00 pm, and it is open only during weekdays, it is straightforward to determine approximately how many hours the lights are on. Similar techniques can be applied to obtain initial values for the remaining systems in the Hours column.

Once the Demand and Hours columns are completed, the Consumption column can be mathematically determined by multiplying demand times hours to obtain kilowatt hours. Alternatively, one or more of the initial estimates in the Consumption column can be obtained using techniques such as described above to provide an additional check or control on the accuracy of the estimates in the other columns.

The first time this process is performed, some of the initial estimates may be closer to guesses than actual known values. In addition, it is likely that the initial values in the columns may not add up to the aggregate values in the Totals row during the first iteration. If one or more of the initial estimates differs by a significant amount from the actual values, however, knowledge of the other (correct) values should allow a user to quickly spot the erroneous numbers and fine tune them over subsequent iterations.

As explained above, some of the initial values placed in table 76 for the first pass may be guesses that differ from the actual values by a relatively large amount. When this happens, it should quickly become evident to the user which numbers are wrong. For example, it may be clear that there are too many hours for one of the systems, but the number on the demand side is also a little light. If this occurs, the user can easily go back and fine tune these numbers. This can be done using various techniques such as revisiting one or more probability distributions, revisiting notes about the building, calling someone, having someone physically inspect the building, and the like.

It should again be emphasized that many of the initial values placed in table 76 for the first pass will be relatively close to the actual values if for no other reason than they are constrained by known values. For example, the three numbers in the Totals row of table 76 provide one such set of constraints. These three constraints are known to a good degree of certainty because they are derived from the actual building coefficients that were determined using the multivariate linear regression analysis discussed above. Another constraint on the values in table 76 is knowledge of where buildings of the same category as building 74 typically operate at based on probability distributions from previously benchmarked buildings.

Accordingly, an iterative process can be used to fine tune the numbers in table 76 to obtain a set of values for all three columns that (to a high level of confidence) are close to the actual empirical values. In addition, it is expected that the final numbers will correspond reasonably well to the probability distribution for that building type.

It should be appreciated that the system benchmarks obtained using the foregoing process are not measured nor deduced from building plans. Rather, the derived physical parameters obtained using the linear regression analysis described above in method 18 are used to determine what is occurring not just with the base loads in the building (i.e., building benchmarks) but also with specific systems that contribute to the base load (i.e., system benchmarks).

As noted above, embodiments within the scope of the present invention include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM or other optical disk storage, magnetic disk storage or other magnetic storage devices, or any other medium which can be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above are also to be included within the scope of computer-readable media. Computer-executable instructions comprise, for example, instructions and data which cause a general purpose computer, special purpose computer, or special purpose processing device to perform a certain function or group of functions.

In some embodiments, the present invention is described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

The present invention in some embodiments, may be operated in a networked environment using logical connections to one or more remote computers having processors.

Logical connections may include a local area network (LAN) and a wide area network (WAN) that are presented here by way of example and not limitation. Such networking environments are commonplace in office-wide or enterprise-wide computer networks, intranets and the Internet. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing device in the form of a conventional computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media provide nonvolatile storage of computer-executable instructions, data structures, program modules and other data for the computer.

Software and web implementations of the present invention could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

It is important to note that the above-described preferred and alternative embodiments are illustrative only. Although the invention has been described in conjunction with specific embodiments thereof, those skilled in the art will appreciate that numerous modifications are possible without materially departing from the novel teachings and advantages of the subject matter described herein. It should also be noted that all numbers discussed above in the examples and illustrated in the figures are for purposes of explanation only and are not to be construed as limiting in any way. The order or sequence of any process or method steps may be varied or re-sequenced according to alternative embodiments. In the claims, any means-plus-function clause is intended to cover the structures described herein as performing the recited function and not only structural equivalents but also equivalent structures. Accordingly, these and all other such modifications are intended to be included within the scope of the present invention. Other substitutions, modifications, changes and omissions may be made in the design, operating conditions and arrangement of the preferred and other exemplary embodiments without departing from the spirit of the present invention.

What is claimed is:

1. A method implemented using a computerized system of benchmarking energy performance in a building of interest, comprising:
    receiving utility use data for the building of interest;
    receiving weather data for the building of interest;
    computing a best thermodynamic break-even ("TBE") temperature for the building of interest based on the utility use data and the weather data;
    assessing energy performance of the building of interest by comparing an energy characteristic of the building of interest to at least one other building; and
    archiving an energy characteristic of the building of interest in a database.

2. The method of claim 1, further comprising aggregating the utility use data.

3. The method of claim 1, further comprising computing at least one of heating degree days and cooling degree days.

4. The method of claim 1, further comprising determining an initial estimate of how energy is used in the building.

5. The method of claim 1, further including performing linear regression analysis to obtain energy use coefficients for the building.

6. The method of claim 5, wherein the linear regression analysis includes solving at least two equations simultaneously in an iterative process.

7. The method of claim 6, wherein the at least two equations model electrical consumption in the building and electrical demand in the building.

8. The method of claim 7, wherein the at least two equations includes a third equation that models fuel use in the building.

9. The method of claim 8, wherein the fuel use includes all non-electrical energy use.

10. The method of claim 5, further including using the energy use coefficients to diagnose a problem in the building.

11. The method of claim 1, further including normalizing the energy use coefficients to obtain benchmarks regarding energy performance in the building.

12. The method of claim 11, further including using the building performance benchmarks to obtain system performance benchmarks.

13. The method of claim 12, wherein the system performance benchmarks are further obtained by one or both of physically inspecting the building and looking at probability distributions of previously benchmarked buildings.

14. The method of claim 11, wherein the normalizing is performed by comparing the energy use coefficients to a building metric.

15. The method of claim 1, wherein the best TBE temperature is obtained by plotting energy use versus degree days.

16. The method of claim 15, wherein the degree days includes at least one of heating degree days and cooling degree days.

17. The method of claim 15, wherein the energy use includes at least one of electrical use and fuel use.

18. The method of claim 15, wherein the energy use includes at least one of electrical consumption and electrical demand.

19. The method of claim 1, wherein the utility use data is received from at least one of paper invoices and electronic invoices.

20. The method of claim 1, wherein the utility use data is received by scanning paper invoices.

21. The method of claim 1, further including archiving the utility use data and weather data in a database.

22. The method of claim 1, wherein the utility use data is obtained from at least one of an owner of the building, a utility service provider, or a utility bill consolidator.

23. The method of claim 1, wherein the utility use data and weather data cover a similar time period.

24. The method of claim 23, wherein the time period is at least about six months.

25. The method of claim 1, wherein the utility use data is received substantially in real time.

26. A method implemented using a computerized system of benchmarking energy performance in a building of interest, comprising:
receiving utility use data for the building of interest;
receiving weather data for the building of interest;
computing a best thermodynamic break-even ("TBE") temperature for the building of interest based on the utility use data and the weather data;
further including normalizing a set of energy use coefficients to obtain benchmarks regarding energy performance in the building, wherein the normalizing is performed by comparing the energy use coefficients to a building metric, and wherein the building metric is one or more of square feet of the building, number of occupants in the building, and number of beds in the building; and
storing the benchmarks in a database for later use.

27. A method implemented using a computerized system of benchmarking energy performance in a building, comprising:
receiving utility use data for the building;
receiving weather data for the building;
computing a best thermodynamic break-even ("TBE") temperature for the building of interest based on the utility use data and the weather data; and
using a web browser to perform at least one of providing input to the method, invoking the method, and receiving output from the method, wherein at least a component of the computed TBE temperature is stored for later use.

28. A computerized system for benchmarking energy performance in a building of interest, comprising:
a central processing unit (CPU); and
a storage device coupled to the CPU and having information stored therein for configuring the CPU to:
receive utility use data for the building of interest;
receive weather data for the building of interest;
compute a best thermodynamic break-even ("TBE") temperature for the building based on the utility use data and the weather data; wherein the storage device is further configured to store at least one of the utility use data, the weather data, and the computed TBE temperature for comparison against other buildings.

29. The system of claim 28, wherein the CPU is further configured to aggregate the utility use data.

30. The system of claim 28, wherein the CPU is further configured to compute at least one of heating degree days and cooling degree days.

31. The system of claim 28, wherein the CPU is further configured to determine an initial estimate of how energy is used in the building.

32. The system of claim 28, wherein the CPU is further configured to perform linear regression analysis to obtain energy use coefficients for the building.

33. The system of claim 32, wherein the linear regression analysis is performed by solving at least two equations simultaneously in an iterative process.

34. The system of claim 33, wherein the at least two equations model electrical consumption in the building and electrical demand in the building.

35. The system of claim 34, wherein the at least two equations includes a third equation that models fuel use in the building.

36. The system of claim 35, wherein the fuel use includes all non-electrical energy use.

37. The system of claim 32, further including using the energy use coefficients to diagnose a problem in the building.

38. The system of claim 28, wherein the CPU is further configured to normalize the energy use coefficients to obtain benchmarks regarding energy performance in the building.

39. The system of claim 38, wherein the CPU is further configured to use the building performance benchmarks to obtain system performance benchmarks.

40. The system of claim 39, wherein the system performance benchmarks are further obtained by one or both of physically inspecting the building and looking at probability distributions of previously benchmarked buildings.

41. The system of claim 38, wherein the normalizing is performed by comparing the energy use coefficients to a building metric.

42. The system of claim 28, wherein the best TBE temperature is obtained by plotting energy use versus degree days.

43. The system of claim 42, wherein the degree days includes at least one of heating degree days and cooling degree days.

44. The system of claim 42, wherein the energy use includes at least one of electrical use and fuel use.

45. The system of claim 42, wherein the energy use includes at least one of electrical consumption and electrical demand.

46. The system of claim 28, wherein the utility use data is received from at least one of paper invoices and electronic invoices.

47. The system of claim 28, wherein the utility use data is received by scanning paper invoices.

48. The system of claim 28, wherein the CPU is further configured to archive the utility use data and weather data in a database.

49. The system of claim 28, wherein the utility use data is obtained from at least one of an owner of the building, a utility service provider, or a utility bill consolidator.

50. The system of claim 28, wherein the utility use data and weather data cover a similar time period.

51. The system of claim 50, wherein the time period is at least about six months.

52. The system of claim 28, wherein the utility use data is received substantially in real time.

53. A computerized system for benchmarking energy performance in a building, comprising:
a central processing unit (CPU); and
a storage device coupled to the CPU and having information stored therein for configuring the CPU to:
receive utility use data for the building;
receive weather data for the building;
compute a best thermodynamic break-even ("TBE") temperature for the building based on the utility use data and the weather data, wherein the CPU is further configured to normalize the energy use coefficients to obtain benchmarks regarding energy performance in the building, wherein the normalizing is performed by comparing the energy use coefficients to a building metric, and wherein the building metric is one or more of square feet of the building, number of occupants in the building, and number of beds in the building.

54. A computerized system of benchmarking energy performance in a building, comprising:
a central processing unit (CPU); and
a storage device coupled to the CPU and having information stored therein for configuring the CPU to:
receive utility use data for the building;
receive weather data for the building; and
compute a best thermodynamic break-even ("TBE") temperature for the building based on the utility use data and the weather data;
wherein the system of benchmarking is configured to use a web browser to cause the CPU to perform at least one of providing input to the system, invoking the system, and receiving output from the system, and wherein at least a component of the computed TBE temperature is stored for later use.

55. A method of assessing energy performance of a building of interest, comprising:
defining a set of benchmarks for a building of interest, comprising:
collecting historical utility use data for the building of interest,
collecting weather data over substantially the same geographic area and time period as the collected utility use data for the building of interest,
solving at least one building equation to identify a plurality of building coefficients using at least one of the collected utility use data and collected weather data,
normalizing the building coefficients using at least one of a building metric and collected weather data;
archiving the defined set of benchmarks in a database; and
comparing the benchmarks against at least one other building, wherein the at least one other building is a building from a normalized set of building data.

56. The method of claim 55, wherein the building coefficients are building-wide energy performance coefficients.

57. The method of claim 55, wherein the building coefficients include building energy use coefficients and specific system energy use coefficients.

58. The method of claim 55, wherein solving the building equation finds six building coefficients that result in the best fit for at the at least one building equation.

59. The method of claim 55, further comprising using a first defined set of benchmarks to define additional building benchmarks.

60. The method of claim 55, wherein normalizing the building coefficients includes dividing an identified building coefficient by a building metric and wherein the building metric is square footage of the building of interest.

61. The method of claim 55, wherein normalizing the building coefficients includes creating a benchmark that may be used to compare the building of interest to other buildings in geographically diverse locations.

62. The method of claim 55, wherein normalizing the building coefficients includes normalizing an identified building coefficient by a determined number of heating days.

63. The method of claim 55, wherein normalizing the building coefficients includes normalizing an identified building coefficient by a determined number of cooling days.

64. The method of claim 55, wherein normalizing the building coefficients includes normalizing using both a building metric and collected weather data.

65. The method of claim 55, wherein archiving the defined set of benchmarks in a database includes archiving the defined set of benchmarks in a database that may be used for comparisons to future buildings of interest.

66. The method of claim 55, wherein comparing the benchmarks against at least one other building includes comparing the benchmarks against buildings across any climate.

67. The method of claim 55, wherein comparing the benchmarks against at least one other building includes comparing the benchmarks against widely geographically diverse buildings.

68. The method of claim 55, further comprising using the defined set of building benchmarks to determine a defined set of system benchmarks.

69. The method of claim 55, further comprising making an initial identification of energy usage, and wherein the initial identification is used to select the at least one building equation to use for building analysis.

70. The method of claim 69, wherein solving at least one building equation includes determining a best fit line to the selected at least one building equation using at least one of the collected utility use data and collected weather data.

71. The method of claim 70, wherein solving at least one building equation is fully automated.

72. The method of claim 70, further comprising:
displaying a graph to a user; and
allowing the user to make a final best fit determination.

73. The method of claim 70, wherein determining a best fit line makes use of linear regression analysis.

74. The method of claim 55, wherein solving at least one building equation is solving for the best thermodynamic break-even temperature.

75. The method of claim 74, wherein solving for the best thermodynamic break-even temperature includes searching for the best thermodynamic break-even temperature based on the use of two or more building equations simultaneously.

76. The method of claim 75, wherein solving for the best thermodynamic break-even temperature includes plotting energy use versus degree days.

77. The method of claim 76, wherein the degree days includes at least one of heating degree days and cooling degree days.

78. The method of claim 77, wherein energy use includes at least one of electrical consumption and electrical demand.

79. The method of claim 55, wherein the building metric is one or more of square feet of the building, number of occupants in the building, and number of beds in the building.

80. The method of claim 55, further including using a web browser to perform at least one of providing input to the method, invoking the method, and receiving output from the method.

81. The method of claim 55, further including using a web browser to display building coefficients.

* * * * *